//

2,809,920

PROCESS FOR THE PREPARATION OF ERGOTAMINE, ERGOTAMININE AND ERGOMETRINE BY SAPROPHYTIC CULTURE OF ERGOT (CLAVICEPS PURPUREA [FR] TUL.) IN VITRO AND ISOLATION OF THE ALKALOIDS THUS PRODUCED

Arthur Stoll, Arlesheim, near Basel, Arthur Brack, Riehen, near Basel, Albert Hofmann, Bottmingen, near Basel, and Hans Kobel, Basel, Switzerland, assignors, by mesne assignments, to Saul & Co., Newark, N. J., as nominee of Fidelity Union Trust Company, executive trustee under Sandoz Trust No Drawing. Application April 9, 1954,
Serial No. 422,242

Claims priority, application Switzerland April 10, 1953

1 Claim. (Cl. 195—81)

The present invention relates to a process for the preparation of ergotamine, ergotaminine and ergometrine by saprophytic culture of ergot (*Claviceps purpurea* [Fr] Tul.) in vitro and isolation of the alkaloids thus produced.

According to this invention, a suitable strain of ergot (*Claviceps purpurea* [Fr] Tul.) can be cultured in vitro on a suitable nutrient medium under certain prescribed conditions in such a way that it produces ergotamine, ergotaminine and ergometrine in quantities large enough for isolation in a pure crystalline form on a preparative scale. This invention is of fundamental importance because it is capable of rendering the production of medicinally important ergot alkaloids independent of natural occurrence and of the artificial culture of ergot in the field.

The saprophytic culture of ergot has been reported several times in the literature and it has been claimed that ergot alkaloids have been detected both in the mycelium and in the culture medium. This claim rests on the results of color tests, principally upon the reaction to the test of van Urk with p-dimethylaminobenzaldehyde (van Urk, Pharm. Weekbl. 66, 437 [1929]). However, this reaction is not specific, since indole and many indole derivatives also give a reddish-violet coloration with this reagent (Ehrlich, Pharm. Zentralh., 1918, 114) and may be mistaken for ergot alkaloids. It is known that various micro-organisms are capable of producing indole or indole derivatives in nutrient medium. For this reason, a positive van Urk reaction cannot be taken as definite evidence of the presence of ergot alkaloids in total extracts.

In many cases, however, the saprophytic cultures of ergot described in the literature were tested for the presence of ergot alkaloids not only by means of color reactions, but also by biological methods (e. g. uterotonic activity). Nevertheless, when applied to complex material such as culture filtrates or extracts of mycelium, these methods of examination cannot be regarded as specific either, since other substances, e. g. histamine, also exert a more or less marked uterotonic action.

That the methods of culturing ergot in vitro described in the literature have not so far led to the successful production of ergot alkaloids on a preparative scale is convincingly demonstrated by the fact that the ergot employed for the manufacture of the active principles is still obtained exclusively by artificial culture in the field or gathered from places where it occurs wild.

Nevertheless, brief mention may be made of the various attempts of this nature which have been described in the literature. McCrea (Amer. J. Bot. 18, 50 [1931]; U. S. Patent No. 2,056,360) claimed that he had succeeded for the first time in producing ergotoxine, histamine and tyramine by saprophytic culture of ergot. This claim was based on biological tests (cock's comb test, oxytocic activity and pressor action), without isolation of the substances mentioned.

Jaretzky (Arch. Pharm. Berl. 273, 348 [1935]) reported the saprophytic culture of ergot on a suitable medium and claimed that the cornutine test (p-dimethylaminobenzaldehyde) and the biological test of Broom and Clark both gave positive results. The formation of alkaloids by *Claviceps purpurea* in saprophytic culture was also described by de Tempe (Thesis, Amsterdam 1945), but again a red coloration with van Urk's reagent was the only basis for this claim.

Burlet, Meyer and Chadue (Therapie 7, 144 [1952]) have recently reported experiments on the saprophytic culture of ergot on a special nutrient medium, the composition of which is not given. On the basis of a positive Freudweiler color test with vanillin in sulphuric acid (Goris, Liot, Janot and Goris: Pharmacie Galenique, Paris, 2, 1231 [1949]) and a positive biological test on the uterus of the guinea pig, the authors assume the presence of alkaloids to have been proved. Sim and Youngken (J. Amer. Pharm. Ass. 40, 434 [1951]) claim to have been able to detect traces of ergot alkaloids in the mycelium of *Claviceps purpurea* cultured in vitro, this claim again being based on the use of the van Urk color test. Since a purplish coloration was taken as positive, it may be assumed that the compounds responsible were certainly not alkaloids of ergot, as these give a blue coloration with van Urk's reagent. The authors themselves describe the reaction in the following words:

"All the extracts from the experimental mycelial tissue materials gave a purplish color which indicated the presence of ergot alkaloids or similar compounds possessing an indole nucleus."

In addition to the color reaction, the authors also carried out biological tests, but here again the results are not conclusive.

In a Japanese patent application (application No. 1676/50, publicized on June 5, 1950) a process was described according to which a certain strain or ergot (*Claviceps purpurea parriesta katagirii*), which is obtained from grasses and not from rye, can be made to produce alkaloids in vitro. In the course of this work it appears that the authors did actually succeed in isolating a crystalline alkaloid on a preparative scale from cultures of this fungus. The alkaloid so obtained was not known previously and has been named agroclavine. In a more recent publication, the Japanese authors Abe, Yamano, Kozu and Kusumoto (J. Agric. Chem. Soc., Japan, 25, 458 [1952]) describe how a nutrient medium containing mannite as a source of carbon and ammonium succinate as a source of nitrogen, was inoculated with a strain of ergot found in Japan as a parasite on *Elymus mollis* Tri., and how they were subsequently able to isolate from the medium the following alkaloids: ergokryptinine, agroclavine, and traces of ergokryptine and ergosine, as well as a new water-soluble alkaloid which they named elymoclavine.

It is thus clear that with the exception of the work described in the last two publications, crystalline preparations have never been isolated from ergot grown by saprophytic culture. The Japanese workers describe only the isolation of ergokryptine and ergokryptinine in addition to previously unknown alkaloids. Up till now, however, no one has succeeded in isolating from an in vitro culture of ergot the alkaloid ergotamine which has so many important uses in obstetrics, gynaecology and internal medicine.

According to the present invention, by using a suitable strain of *Claviceps purpurea* and a suitable nutrient medium, and by observing certain prescribed conditions, it is possible to grow the fungus in vitro in such a way that it produces ergotamine and other ergot alkaloids, such as ergotaminine and ergobasine, in quantities sufficient to enable them to be isolated in a pure crystalline form on a preparative scale.

It is a characteristic feature of the present invention that spores of the aforesaid strain of Claviceps purpurea are cultured in a culture medium which contains zinc ions and iron ions with formation of a mycelium containing the desired alkaloids which can be isolated from such mycelium.

According to the present invention, the mycelium weight of the cultures as well as the alkaloid content of the formed mycelium is dependent upon the concentration of the zinc and iron ions in the nutrient solution. All cultures without iron and all cultures without zinc have a low mycelium weight and produce no alkaloids. With a constant iron content in the nutrient solution, the mycelium weight increases with increasing zinc additions up to a zinc content of $12 \times 10^{-6}$ mol of $ZnSO_4.7H_2O$ per liter, above which no further increase is realized. With increasing zinc content, up to the same concentration, the alkaloid content of the mycelium also increases. Within the limiting concentrations from $0.75 \times 10^{-5}$ to $12 \times 10^{-5}$ mol of $FeSO_4.7H_2O$ per liter, increase of the iron concentration, while maintaining the zinc concentration constant, increases neither the mycelium weight nor the alkaloid content, except when the zinc content is less than $12 \times 10^{-6}$ mol of $ZnSO_4.7H_2O$ per liter. If the concentration of $FeSO_4.7H_2O$ is increased to $48 \times 10^{-5}$ mol per liter, then a slight growth inhibition is noticeable, while the alkaloid content is not decreased. The following Tables 1 and 2 illustrate these relationships. These tables respectively set forth mycelium weights in milligrams and alkaloid content in percent of the dry mycelium, as obtained in charges of 10 cubic centimeters each after a run of 21 days.

TABLE 1

*Mycelium weights in milligrams*

[Note.—At the top of each column is the zinc concentration, expressed in mols$\times 10^{+6}$ of $ZnSO_4.7H_2O$, while the number at the beginning of each subsequent line gives the iron concentration, expressed in mols $\times 10^{+5}$ of $FeSO_4.7H_2O$]

| Zn Conc'n | 0 | 1.5 | 6 | 12 | 24 | 48 | 96 | 192 |
|---|---|---|---|---|---|---|---|---|
| Fe Conc'n: | | | | | | | | |
| 0 | 66 | 71 | 70 | 73 | 69 | 85 | 74 | 89 |
| 0.75 | 68 | 101 | 221 | 238 | 260 | 280 | 279 | 288 |
| 3 | 79 | 118 | 265 | 252 | 220 | 276 | 240 | 251 |
| 12 | 72 | 161 | 263 | 252 | 249 | 289 | 278 | 297 |
| 48 | 62 | 135 | 156 | 199 | 215 | 221 | 189 | 206 |

TABLE 2

*Alkaloid content of the dry mycelium in percent by weight*

[Note.—The numbers at the top of each column and at the beginning of each subsequent line have the same significances as in Table 1]

| Zn Conc'n | 0 | 1.5 | 6 | 12 | 24 | 48 | 96 | 192 |
|---|---|---|---|---|---|---|---|---|
| Fe Conc'n: | | | | | | | | |
| 0 | 0 | 0 | 0 | 0 | 0 | 0 | 0 | 0 |
| 0.75 | 0 | 0 | 0.04 | 0.17 | 0.18 | 0.13 | 0.13 | 0.11 |
| 3 | 0 | 0 | 0.09 | 0.18 | 0.19 | 0.11 | 0.20 | 0.17 |
| 12 | 0 | 0.15 | 0.16 | 0.20 | 0.17 | 0.17 | 0.22 | 0.17 |
| 48 | 0 | 0.05 | 0 | 0.20 | 0.19 | 0.19 | 0.23 | 0.16 |

It follows from these tables that the optimum iron concentration lies between $0.75 \times 10^{-5}$ and $12 \times 10^{-5}$ mol of $FeSO_4.7H_2O$ per liter of nutrient solution, and that the optimum zinc concentration lies between $1.2 \times 10^{-5}$ and $19.2 \times 10^{-5}$ mol of $ZnSO_4.7H_2O$ per liter of nutrient solution.

The following illustrates the manner in which the process of the invention may be carried out:

The culture medium, the exact composition of which is given hereinafter, is sterilized and inoculated with spores of Claviceps purpurea (Fr.) Tul. and then incubated. After some time the solution becomes covered by a layer of mycelium which usually has a dark brownish violet color. The mycelium is removed, dried and the alkaloids isolated as described below. The filtered culture medium is extracted separately, and yields pure ergotamine together with small quantities of ergotaminine and ergobasine. To obtain the alkaloids, the following procedure may be applied both to the mycelium and to the culture solution. The fatty constituents are first extracted with an organic solvent which leaves the alkaloids undissolved, and the alkaloid-containing material is then made into a paste with aqueous soda (sodium carbonate) solution. This liberates the alkaloids from their salt-like combination and they can then be extracted with an organic solvent such as ether. The alkaloids are removed from the ether solution by extraction with an acid, e. g. tartaric acid, and the aqueous extract purified by shaking out with an organic solvent. The entire aqueous solution is then made alkaline, e. g. by addition of sodium bicarbonate, and the alkaloids taken up in an organic solvent immiscible with water. The separation and purification of the crude bases obtained in this way can be carried out, for example, by chromatography on alumina. The ergot alkaloids ergotamine, ergotaminine and ergobasine so obtained agree in all their properties with the preparations obtained from natural ergot.

The following examples illustrate the invention with reference to presently-preferred illustrative embodiments. Temperatures are in degrees centigrade; percentages are by weight.

EXAMPLE 1

In the present example, the culture of ergot in vitro and the isolation of the active principles are described in detail. For the preparation of the nutrient medium, a solution is first made up having the following composition:

1.00 gram of $Ca(NO_3)_2$
0.25 gram of $MgSO_4$
0.25 gram of $KH_2PO_4$
0.125 gram of KCl
100.00 grams of sucrose
10.00 grams of L(+)-asparagine
0.01 gram of cysteine hydrochloride
0.0001 gram of aneurine
0.000001 gram of biotin and
Ad 1000.00 cc. of distilled water.

To this is then added 0.30 cc. of the following solution:

42.00 grams of $FeSO_4.7H_2O$
2.00 grams of $MnSO_4.7H_2O$
0.50 gram of KI
0.05 gram of $NiCl_2.6H_2O$
0.05 gram of $CoCl_2.6H_2O$
0.20 gram of $3TiO_2SO_3.5H_2O$
0.10 gram of $ZnSO_4.7H_2O$
0.05 gram of $CuSO_4.5H_2O$
0.10 gram of $Be(NO_3)_2$
0.05 gram of $H_3BO_3$
1.00 cc. of conc. $H_2SO_4$ and
Ad 1000.00 cc. of distilled water.

The final solution which has a pH of 4.6, is sterilized for 20 minutes in an autoclave at 107°. 10 cc. of the solution prepared in this way are inoculated with 2 drops of a suspension containing conidia of *Claviceps purpurea* (Fr.) Tul. The culture is kept undisturbed in a dark room at constant temperature and humidity, e. g. at 24° C. and a humidity of 60–65%. After 26 days, a compact mycelium having a dark violet color has formed, while the culture medium has a pH of 4.8 and has developed a pale reddish brown color. After removal and drying, the mycelium weighs 250 mg.

To demonstrate the presence of the alkaloids, both the mycelium and the culture medium are made alkaline, extracted with ether and the ethereal solution shaken out with a 1% solution of tartaric acid. The aqueous solution of the tartrates is then treated with van Urk's reagent (p-dimethylaminobenzaldehyde in sulphuric acid solution) and the color developed under the quartz lamp (Smith, U. S. Public Health Reports 45, 1466 (1930); Schlemmer, Wirth and Peters, Arch. Pharm., Berl. 274, 16 (1936)). The intensity of the blue coloration corresponds to an alkaloid content of 0.1% in the dry mycelium and 0.0076 mg. per cc. in the culture solution (based on a molecular weight of 600).

The isolation of the active principles from a larger quantity of mycelium obtained in this way and from the corresponding culture solution is carried out in the following manner:

260 grams of dried mycelium are defatted by shaking for ½ hour with 2.6 liters of petroleum ether, filtering off and shaking with two further portions of 1.3 liters of petroleum ether.

The defatted material is now made into a paste with 260 cc. of 5% aqueous sodium carbonate solution and then extracted with ether by shaking for ½ hour on the shaking machine, first with 2.6 liters of ether and then twice more with 1.3 liters of ether. The alkaloids are removed from the combined ether extracts by shaking out with a 1% aqueous solution of tartaric acid, first with 1.3 liters and then with four further portions of 0.65 liter of the solution. In order to remove neutral and acid impurities, the combined aqueous extracts are shaken out three times with 300 cc. of ether and each ether extract washed twice with 100 cc. of a 1% aqueous solution of tartaric acid. The tartaric acid washings are combined with the main tartaric acid extract which is then made alkaline by addition of sodium bicarbonate. The alkaloidal bases are thus liberated and the fraction insoluble in water is extracted by shaking out with 500 cc. of ether and then with three further portions of 250 cc. of ether. The combined ether extracts are dried over sodium sulphate and then evaporated to dryness under reduced pressure. The residue of crude alkaloids thus obtained weighs 0.31 gram.

This preparation is purified by dissolving in chloroform containing 1% alcohol and allowing the solution to percolate through a column containing 31 grams of Brockmann's alumina. The fractions which fluoresce blue in ultraviolet light, showing that they contain alkaloid, are collected separately and evaporated to dryness. The residue from the more rapidly travelling blue zone weighs 0.039 gram. It is taken up in 0.5 cc. of methanol from which the alkaloid immediately crystallizes. Yield: 0.030 gram of ergotaminine. After recrystallizing once from methanol, in which the compound is very sparingly soluble, it is obtained in the form of triangular platelets which melt at 240° with decomposition and exhibit a specific rotation $[\alpha]_D^{20} = +367°$ ($\pm 3°$) ($c=0.5$ in chloroform).

The residue obtained on evaporation of the more slowly travelling zone of the chromatogram weighs 0.137 gram. On taking up in 0.5 cc. of 90% acetone, the alkaloid crystallizes in the horizontally truncated, polyhedral, highly refringent prisms typical of ergotamine, M. P. 180° with decomposition. Yield: 0.133 gram of ergotamine. On drying in high vacuum at 80° the crystals lose 20% of their weight, corresponding to a content of solvent of crystallization of 2 mols acetone and 2 mols water, according to the formula $$C_{33}H_{35}O_5N_5 \cdot 2CH_3COCH_3 \cdot 2H_2O$$

The specific rotation of the substance dried in this way is $[\alpha]_D^{20} = -160°$ ($c=0.6$ in chloroform). The alkaloid also agrees completely with authentic ergotamine in all other properties, e. g. in its solubility in various organic solvents, blue coloration with Keller's reagent, etc.

In order to isolate the water-soluble alkaloids, the aqueous solution from which the ergotamine and ergotaminine have been extracted is saturated with solid sodium chloride, made alkaline by addition of 10 gram of sodium hydroxide, and extracted first with 2 liters of ether and then with 2 further portions of 1 liter of ether. On drying the ether extract over sodium sulphate and evaporating to dryness, a residue weighing 90 mg. is obtained. The alkaloidal content as determined colorimetrically is 29 mg. (calculated on a molecular weight of 600). On taking up in a little methanol, 50 mg. of fatty, non-alkaloidal impurities remain undissolved and are filtered off. The residue which remains on evaporation of the filtrate is taken up in chloroform containing 1% alcohol and purified by chromatography on a small column of alumina. The residue obtained after evolution of the column and evaporation to dryness of the chromatographed solution is taken up in 0.2 cc. of chloroform from which 6 mg. of ergometrine crystallizes out as the sparingly soluble chloroform compound. On recrystallizing from benzene, the product is obtained in the form of soft needles melting at 159–162°. The compound thus obtained agrees in all its properties with authentic ergometrine.

The 7 liters of culture filtrate, having a pH of 4.8, which are obtained after filtering off the mycelium in the above experiment, are brought to a pH of 8.0 by addition of 2 N aqueous sodium bicarbonate solution and shaken out twice with 1.4 liters of ether. The alkaloidal portion of the combined ether extracts is removed by shaking out twice with 400 cc. of 1% aqueous tartaric acid. The aqueous extract is then made alkaline with soda and extracted once with 250 cc. of chloroform and three times more with 100 cc. of chloroform. After drying over sodium sulphate, the chloroform solution is evaporated to dryness giving a residue weighing 68 mg. The alkaloidal content as determined colorimetrically according to the method of van Urk and Smith is 56 mg. (calculated on a molecular weight of 600).

The separation and purification of the crude alkaloids is effected by chromatography on a column of alumina using chloroform containing 1% alcohol as solvent. Two separate zones which fluoresce blue in ultraviolet light are formed.

The residue obtained on evaporation of the more rapidly travelling zone weighs 32 mg. On taking up in 0.4 cc. of methanol, 20 mg. of a very sparingly soluble alkaloid separate out. This melts at 235–240° (decomp.) and exhibits a specific rotation of $[\alpha]_D^{20} = +365°$ ($\pm 5°$) (in chloroform), which identifies it as ergotaminine. In all other properties this alkaloid also agrees with authentic ergotaminine.

The solution obtained by elution of the more slowly travelling zone of the chromatogram yields a residue weighing 13 mg. on evaporation to dryness. When this is taken up in 0.1 cc. of 90% acetone, 10 mg. of ergotamine crystallize out in the horizontally truncated polyhedral prisms typical of this alkaloid. The melting point of 180° (decomp.) and the specific rotation $[\alpha]_D^{20} = -160°$ (in chloroform), as well as all the other properties, agree with those of authentic ergotamine.

In order to isolate the water-soluble alkaloid fraction, the aqueous mother liquors are saturated with sodium chloride, made alkaline by addition of 10 grams of sodium hydroxide, and then shaken out first with 500 cc. of a mixture containing three parts of chloroform to 1 part of isopropyl alcohol and afterwards three times with 100 cc. of the same mixture. After drying over sodium sulphate, the extract is evaporated to dryness, yielding a residue weighing 6 mg. This is purified by chromatography on a column of alumina, using chloroform containing 1% alcohol as solvent and yields approximately 1 mg. of an alkaloid, which is sparingly soluble in alcohol; its chromatographic behavior and crystalline properties indicate that it is ergometrine.

EXAMPLE 2

A nutrient solution is prepared by dissolving 1.00 gram of $Ca(NO_3)_2$
0.25 gram of $MgSO_4$
0.25 gram of $KH_2PO_4$
0.125 gram of $KCl$
0.03336 gram of $FeSO_4.7H_2O$
0.003444 gram of $ZnSO_4.7H_2O$
100.00 grams of sucrose
10.00 grams of L(+)-asparagine
0.01 gram of cysteine hydrochloride
0.0001 gram of aneurine and
0.000001 gram of biotin in sufficient distilled water to make 1000.00 cc. of solution, to which there is added 0.30 cc. of the following solution:

2.00 grams of $MnSO_4.7H_2O$
0.50 gram of $KI$
0.05 gram of $NiCl_2.6H_2O$
0.05 gram of $CoCl_2.6H_2O$
0.20 gram of $3 TiO_2SO_3.5H_2O$
0.05 gram of $CuSO_4.5H_2O$
0.10 gram of $Be(NO_3)_2$
0.05 gram of $H_3BO_3$
1.00 cc. of conc. $H_2SO_4$ and
Ad 1000.00 cc. of distilled water.

The finished nutrient solution has a pH of 5.0. It is further treated in the same way as that described in Example 1. The mycelium obtained from 1 liter of such culture solution weighs 25.2 grams and contains 0.0504 gram of alkaloids. These can be separated into the individual components after the manner described in Example 1.

EXAMPLE 3

A nutrient solution is prepared by dissolving 1.00 gram of $Ca(NO_3)_2$
0.25 gram of $MgSO_4$
0.25 gram of $KH_2PO_4$
0.125 gram of $KCl$
0.13344 gram of $FeSO_4.7H_2O$
0.013776 gram of $ZnSO_4.7H_2O$
100.00 grams of sucrose
10.00 grams of L(+)-asparagine
0.01 gram of cysteine hydrochloride
0.0001 gram of aneurine and
0.000001 gram of biotin in sufficient distilled water to make 1000.00 cc. of solution, to which there is added 0.30 cc. of the following solution:

2.00 grams of $MnSO_4.7H_2O$
0.50 gram of $KI$
0.05 gram of $NiCl_2.6H_2O$
0.05 gram of $CoCl_2.6H_2O$
0.20 gram of $3TiO_2SO_3.5H_2O$
0.05 gram of $CuSO_4.5H_2O$
0.10 gram of $Be(NO_3)_2$
0.05 gram of $H_3BO_3$
1.00 cc. of conc. $H_2SO_4$ and
Ad 1000.00 cc. of distilled water.

The finished nutrient solution has a pH of 4.9. It is further treated in the same way as that described in Example 1. The mycelium obtained from 1 liter of such culture solution weighs 22.1 grams and contains 0.0420 gram of alkaloids. These can be separated into the individual components after the manner described in Example 1.

EXAMPLE 4

A nutrient solution is prepared by dissolving 1.00 gram of $Ca(NO_3)_2$
0.25 gram of $MgSO_4$
0.25 gram of $KH_2PO_4$
0.125 gram of $KCl$
0.03336 gram of $FeSO_4.7H_2O$
0.027552 gram of $ZnSO_4.7H_2O$
100.00 grams of sucrose
10.00 grams of L(+)-asparagine
0.01 gram of cysteine hydrochloride
0.0001 gram of aneurine and
0.000001 gram of biotin in sufficient distilled water to make 1000.00 cc. of solution, to which there is added 0.30 cc. of the following solution:

2.00 grams of $MnSO_4.7H_2O$
0.50 gram of $KI$
0.05 gram of $NiCl_2.6H_2O$
0.05 gram of $CoCl_2.6H_2O$
0.20 gram of $3TiO_2SO_3.5H_2O$
0.05 gram of $CuSO_4.5H_2O$
0.10 gram of $Be(NO_3)_2$
0.05 gram of $H_3BO_3$
1.00 cc. of conc. $H_2SO_4$ and
Ad 1000.00 cc. of distilled water.

The finished nutrient solution has a pH of 5.0. It is further treated in the same way as that described in Example 1. The mycelium obtained from 1 liter of such culture solution weighs 27.8 grams and contains 0.0612 gram of alkaloids. These can be separated into the individual components after the manner described in Example 1.

Having thus disclosed the invention what is claimed is:

A process for the production of ergotamine, ergotaminine and ergometrine in crystalline form by saprophytic culture of ergot, comprising the step of inoculating an aqueous culture medium which contains from 3.444 to 55.1 milligrams of $ZnSO_4.7H_2O$ per liter and from 2.085 to 133.44 milligrams of $FeSO_4.7H_2O$ per liter with spores of *Claviceps purpurea* (Fr.) Tul., incubating the inoculated culture medium, separating the resultant mycelium from the culture solution, and recovering the aforesaid alkaloids from said mycelium and from the residual solution in crystalline form.

References Cited in the file of this patent

UNITED STATES PATENTS

| | | |
|---|---|---|
| 1,394,233 | Stoll | Oct. 18, 1921 |
| 2,056,360 | McCrea | Oct. 6, 1936 |
| 2,640,007 | Foote | May 26, 1953 |

OTHER REFERENCES

Foster: The Botanical Review, vol. V, No. 4, April 1939, page 207.

Alexopoulos: Introductory Mycology, 1952, John Wiley Inc., New York, pages 268–270.